US006584665B1

(12) United States Patent
Sabesky

(10) Patent No.: US 6,584,665 B1
(45) Date of Patent: Jul. 1, 2003

(54) METHOD AND APPARATUS FOR SEPARATING COMPONENTS OF FILTERS FOR OIL AND FUEL

(75) Inventor: Ivan Sabesky, Winnipeg (CA)

(73) Assignee: Health, Safety & Environmental Solutions Inc., Winnipeg (CA)

( * ) Notice: Subject to any disclaimer, the term of this patent is extended or adjusted under 35 U.S.C. 154(b) by 0 days.

(21) Appl. No.: 10/162,558

(22) Filed: Jun. 6, 2002

(51) Int. Cl.[7] .................................................. H02G 1/12

(52) U.S. Cl. .................... 29/403.3; 29/426.4; 29/426.5; 29/801

(58) Field of Search ............................. 29/403.3, 426.4, 29/426.5, 896.62, 801; 100/91, 98 R, 902

(56) References Cited

U.S. PATENT DOCUMENTS 4,418,460 A 12/1983 Ruth
5,165,334 A 11/1992 Aluotto et al.
5,218,830 A 6/1993 Rozycki
5,236,136 A 8/1993 McCarty et al.

*Primary Examiner*—P. W. Echols
(74) *Attorney, Agent, or Firm*—Ryan W. Dupuis; Adrian D. Battison; Michael R. Williams

(57) ABSTRACT

A method and apparatus is provided for separating an internal filtering component from an outer casing of an internal combustion type oil or fuel filter. The apparatus includes a holder having an opening extending therethrough and a peripheral support about the opening upon which the filter is supported with an open end of the casing in alignment with the opening of the holder. A rigid ram rod is penetrated into the capped end of the casing and subsequently punched through the casing to punch the internal filtering component out through the open end of the casing.

20 Claims, 6 Drawing Sheets

METHOD AND APPARATUS FOR SEPARATING COMPONENTS OF FILTERS FOR OIL AND FUEL

FIELD OF THE INVENTION

The present invention relates to a method and apparatus for separating components of oil and fuel filters and more particularly to a method and apparatus for separating internal filter components from an outer casing of a filter of the type commonly used on internal combustion engines.

BACKGROUND

Filters of the type which are commonly used on internal combustion engines for filtering oil and fuel, are frequently disposed of despite having components of material which may be recycled, due to the difficulty of separating the internal filtering components from the outer casing of the filters. Filters are thus commonly crushed to drain excess fluid therefrom before disposal as exemplified by U.S. Pat. No. 5,165,334 to Aluotto et al. While crushing permits leftover fluids in the filter to be reclaimed, the metallic components are typically not permitted to be recycled.

Other arrangements for recycling filters include cutters or shredders for separating the components of the filter to be recycled separately. U.S. Pat. No. 5,214,830 to Rozycki provides an example of a cutter for an oil filter and U.S. Pat. No. 5,236,136 to McCarty et al provides a system for shredding oil filters and subsequently separating the metallic shredded components. In each of these operations complex mechanisms are required which require considerable maintenance while resulting in a time consuming process for separating the components of the oil filters.

U.S. Pat. No. 4,418,460 to Ruth provides a method and apparatus for separating a metallic lid secured to a metallic container in which a punch is used which extends through the container. The particular configuration of the device however is clearly not intended for use with fuel or oil filters as inadequate support is provided to the containers when removing the lid with a punch as would be required for removing the internal filtering components of an oil filter, for example. Ruth teaches securing the containers by gripping the side walls thereof, however when considering the forces required to remove the internal components of an internal combustion engine type filter through one end thereof, the side walls of the filter would buckle when gripped before the internal components of the filter broke through the open end of the filter.

SUMMARY

According to one aspect of the present invention there is provided an apparatus for separating components of a filter having an outer cylindrical casing component including an open end in communication with an internal filtering component and a capped end, the apparatus comprising:

a rigid ram rod having a penetrating end which is movable in an axial direction of the ram rod;

a filter holder having an opening extending therethrough in the axial direction of the ram rod in alignment with the ram rod and a peripheral support about the opening for supporting the cylindrical casing component of a filter thereon with the open end in alignment with the opening; and an actuator for displacing the ram rod in the axial direction of the ram rod between a loading position in which the ram rod is spaced in the axial direction from the filter holder with the penetrating end facing the peripheral support and a punching position extending through the opening in the filter holder beyond the peripheral support;

whereby the penetrating end of the ram rod penetrates the capped end of a filter supported on the filter holder to push the internal filtering component through the open end of the cylindrical casing component as the ram rod is displaced from the loading position to the punching position.

The filter holder provides a peripheral support for supporting the cylindrical casing of a filter thereon in alignment with an opening in the holder so that a ram rod may be used to punch out the internal components of the filter in a quick single operation which requires minimal moving parts and thus minimal maintenance. Orienting the peripheral support to face the penetrating end of the ram rod provides a surface upon which the cylindrical casing may be stably supported during the punching operation without concern of the sides of the filter buckling due to the forces required to push the internal filtering components out through the open end of the filter casing.

The holder may comprise a collar substantially concentrically aligned with the ram rod. The peripheral support in this instance preferably comprises a shoulder formed in an inner surface of the collar which extends at least partway about a circumference of the collar. The shoulder preferably spans radially less than 2 centimeters from the inner surface of the collar.

The peripheral support may extend about a full circumference of the opening or may extend intermittently about the circumference in alternate embodiments.

When the ram rod and holder are supported on a frame, the holder is preferably selectively separable from the frame for replacement with holders having differing dimensions.

The penetrating end of the ram rod preferably include a pointed projection and a gripping surface which projects radially outwardly from a base of the pointed projection. Ideally, the base of the pointed projection is smaller in diameter than an internal diameter of a threaded mount of the filter at the open end thereof, while the gripping surface at the penetrating end of the ram rod has a larger diameter than an internal diameter of a threaded mount of the filter at the open end thereof.

There may be provided a plurality of ram rods in alignment with respective holders, the ram rods being movable together between respective loading and punching positions by the actuator.

In one embodiment, the ram rod is supported in an upright orientation above the holder and there is provided a receptacle below the holder for receiving the internal filtering component of a filter therein.

In further embodiments, the ram rod extends generally horizontally, in which instance there may be provided a loading mechanism above the holder for loading filters into the holder. A pusher may also be provided, supported for movement in the axial direction in alignment with the opening in the holder opposite the ram rod.

There may be provided a rod stripper including an aperture therein for receiving the ram rod therethrough, the ram rod being movable relative to the rod stripper between the loading and punching positions.

According to a further aspect of the present invention there is provided a method of separating components of a filter, the method comprising:

providing a filter including an outer cylindrical casing component having an open end in communication with an internal filtering component and a capped end;

providing a holder having an opening extending therethrough and a peripheral support about the opening;

supporting the cylindrical casing component of the filter on the peripheral support of the holder with the open end in alignment with the opening;

providing a rigid ram rod having a penetrating end which is movable in an axial direction of the ram rod in alignment with the opening extending through the holder;

penetrating the penetrating end of the ram rod through the capped end of the filter by displacing the ram rod in the axial direction between a loading position in which the ram rod is spaced in the axial direction from the holder and a punching position extending through the opening in the holder beyond the peripheral support of the holder until the internal filtering component of the filter is pushed through the open end of the cylindrical casing component.

When there is provided a plurality of holders having different size openings therein corresponding to different size filters, the method preferably includes selecting a holder having an opening which is closest to a size of the filter to be separated.

When the holder comprises a collar in which the peripheral support comprises a shoulder extending at least partway about an inner surface of the collar, the inner surface of the collar preferably has a diameter within two centimetres of the outer diameter of the outer casing component.

BRIEF DESCRIPTION OF THE DRAWINGS

In the accompanying drawings, which illustrate exemplary embodiments of the present invention.

DETAILED DESCRIPTION

Figure 1:
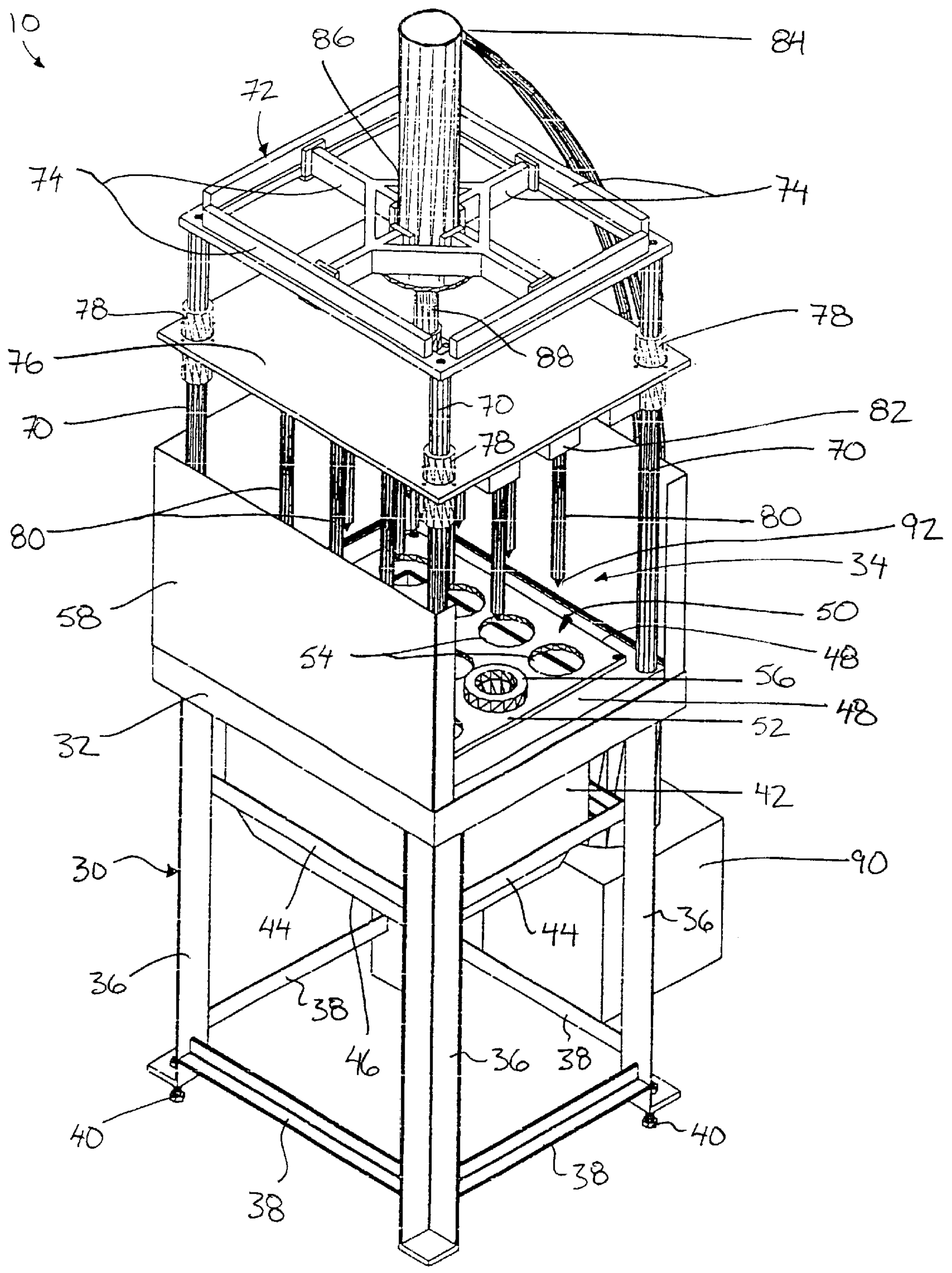
FIG. 1 is an isometric view of the apparatus for separating components of an filter.
Figure 3:
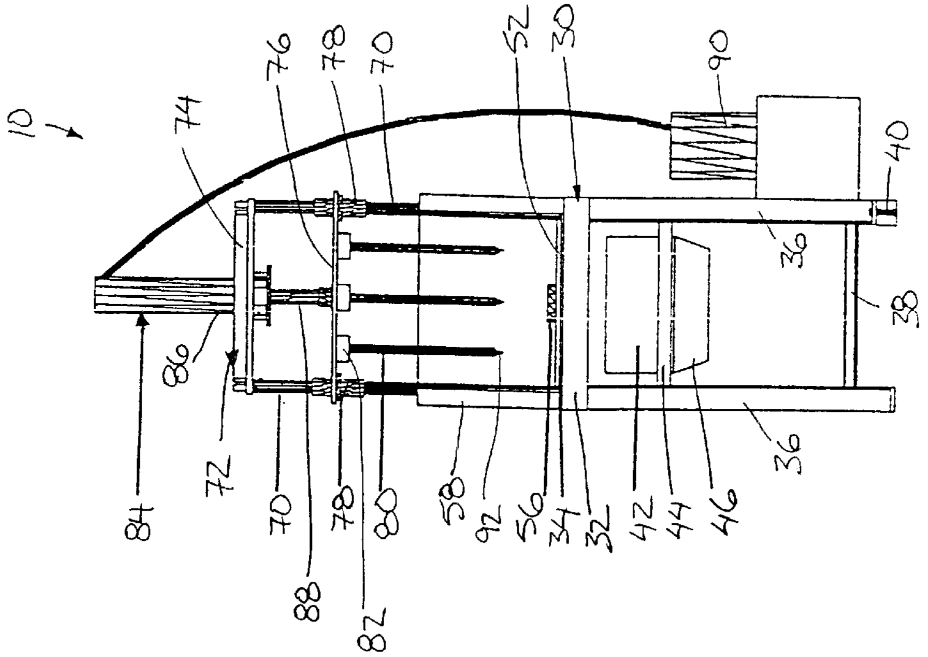
FIGS. 2, 3 and 4 are rear elevational, side elevational and top plan views of the apparatus of FIG. 1.
Figure 2:
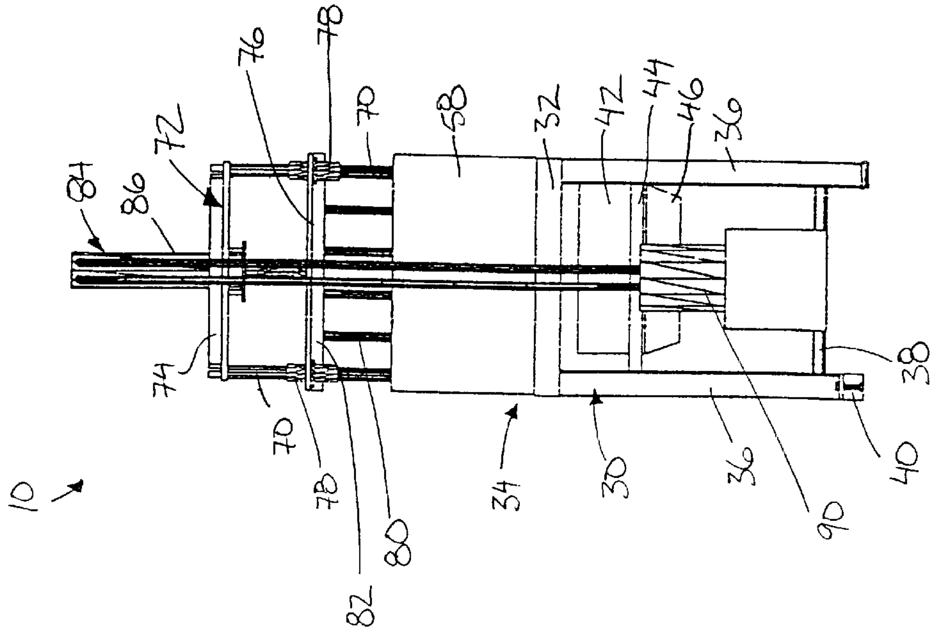

Referring to the accompanying drawings, there is illustrated an apparatus for separating components of a filter generally indicated at reference numeral 10. The apparatus 10 is particularly useful for internal combustion type fuel or oil filters 12 for recycling various materials from which the filters are made.

In the illustrated embodiment, an oil filter 12 is shown, generally of the type having a cylindrical outer casing 14 having a capped end 16 and an open end 18. An internal filtering component 20 is housed within the casing for filtering oil therethrough which is communicated through the open end 18 of the casing by a communicating port 22 of the internal filtering component at the open end 18 of the casing at a threaded nut 24 which mounts the filter in position in internal combustion engine applications.

The apparatus 10 generally includes a frame 30 formed of rigid metallic components. The frame 30 includes a perimeter frame 32 having four sides which extend about a square perimeter of a working area 34 of the apparatus which is spaced upwardly from the floor upon which the apparatus is supported. Four legs 36 are provided at respective corners of the perimeter frame 32 to support the frame spaced upwardly from the ground. Braces 38 are provided which span between each adjacent pair of legs 36 adjacent a bottom end thereof, with both the braces and the legs being formed of suitable angle iron material for structural rigidity. A bottom end of two diagonally opposed legs 36 includes an adjustable footing 40 in the form of a threaded support extending from the bottom of the respective leg 36 to permit some height adjustment of the leg for levelling of the apparatus by rotating the threaded support.

A bin 42 is provided which is supported on the frame 30 below the working area 34 thereof. The bin is supported on respective braces 44 spanning between adjacent legs 36 of the frame. The bin includes an open top end which spans between the braces at the legs 36 with enclosed sides and a tapered bottom 46 which narrows in dimension so as to collect separated filter components in the bottom end thereof.

A support flange 48 is provided about a perimeter of the working area 34, supported on the perimeter frame 32. The support flange projects inwardly from all sides of the perimeter frame 32 within a generally common plane surrounding a square opening 50 above the bin 42. A working surface is provided in the form of a plate 52 which fastens onto the support flange 48 in an overlapping configuration with the support flange on all sides of the plate. The plate 52 is generally rectangular and includes an array of circular openings 54 formed therein having substantially identical dimensions. Each circular opening 54 is suitably arranged for supporting a filter holder 56 therein.

The working area 34 further includes a shield 58 in the form of three side panels, each extending upwardly from one side of the perimeter frame 32, in a generally U-shaped configuration. A remaining fourth side of the perimeter frame 32 is open to permit access for loading of filters onto respective holders 56 of the working surface plate 52.

Each filter holder 56 generally comprises a collar 60 having a stepped outer surface 62 which is arranged to be supported within a respective circular opening 54 of the working surface plate 52. The inner surface 64 is similarly stepped to define a shoulder 66 upon which a peripheral rim 68 of a filter 12 is supported. A resulting opening extending through the collar 60 is concentric about a vertical axis and is arranged for concentric alignment with the open end 18 of a filter supported on the shoulder 66.

The stepped outer surface of the collar includes an upper portion which is greater in diameter than a respective circular opening 54 which receives the holder therein, while a lower portion of the outer surface is less in diameter than the respective circular opening to permit the lower portion to be received therein. Preferably the lower portion of the outer surface 62 substantially matches the inner diameter of the respective circular opening for snugly receiving the filter holder within the opening.

Dimensions of the upper and lower portions of the inner surface 64 will vary depending upon the particular application and size of a filter 12 being used thereon. In general, the internal diameter of the inner surface at an upper portion above the shoulder 66 generally will not be more than two centimeters in diameter greater than the overall outer diameter of the filter 12 at the rim 68 thereof which is supported on that particular filter holder 56. The shoulder 66 subsequently spans inwardly a horizontal, radial distance ideally between one half and one centimeter depending upon the overall size of the filter in question, with a two centimeter shoulder 66 generally being the maximum permitted so as to not overly obstruct the open end of the filter. The shoulder 66 is generally constant in depth and extends a full circumference of the collar 60 to provide balanced support to a filter supported thereon. In further embodiments, the shoulder 66 may have varying depth or may only extend partway about a circumference of the filter holder while still remaining balanced about a central axis of the holder.

The filter holders remain selectively separable from the working surface plate 52 because the stepped outer surface 62 permits the filter holders to be supported within the respective circular openings 54 by resting thereon. In use different size filter holders are thus permitted to be selected and inserted in position on the working surface plate 52 depending upon the size of filters 12 to be separated.

Separation of the components of the filter is performed by a punching mechanism supported above the working area of the apparatus. The punching mechanism includes four corner posts 70 which are mounted at a bottom end at respective corners of the perimeter frame 32 to extend vertically upwardly therefrom, parallel and spaced apart from one another. A top frame 72 spans between the top ends of the posts 70 in the form of side and cross braces 74. A sliding frame 76 in the form of a horizontal plate is supported for a sliding movement on the posts 70 at a position between the top frame and the perimeter frame 32 of the apparatus. The plate of the sliding frame 76 includes sliding collars 78 supported at the corners thereof having a mating cross-section with the posts 70 for respective sliding movement there along.

The sliding frame 76 supports an array of ram rods 80 thereon which extend vertically, parallel and spaced apart from one another, from the plate of the sliding frame 76 towards the working area of the apparatus. Each ram rod 80 is coaxial with a respective filter holder 56 for vertical sliding movement in an axial direction of the ram rod towards and away from the respective holder. The ram rods are all fixed onto the sliding frame 76 for movement together therewith as the sliding frame slides vertically in respective axial directions of the ram rods along the posts 70. Each ram rod 80 includes a respective support block 82 having increased radial dimensions than that of the ram rod for more stabily supporting the ram rod on the plate of the sliding frame 76.

An actuator 84 is provided for displacing the ram rods collectively in their respective axial directions. The actuator 84 generally comprises a hydraulic piston cylinder which acts between the top frame 72 and the sliding frame 76 to urge the sliding frame downwardly towards the working area under hydraulic pressure when actuated. A cylinder portion 86 of the actuator 84 is centrally supported in fixed relationship to the top frame 72 while the piston portion 88 of the actuator is mounted on the plate of the sliding frame 76 in a horizontally centred position with respect to the array of ram rods 80.

Figure 6:
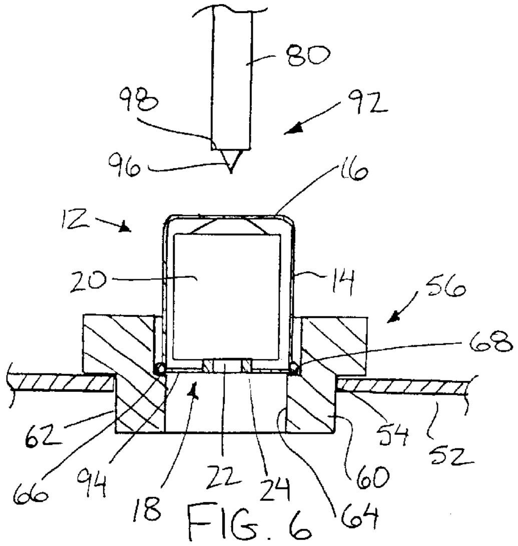
FIGS. 6 through 9 illustrate the various stages of the ram rod being displaced between a loading position and a punching position thereof.
Figure 8:
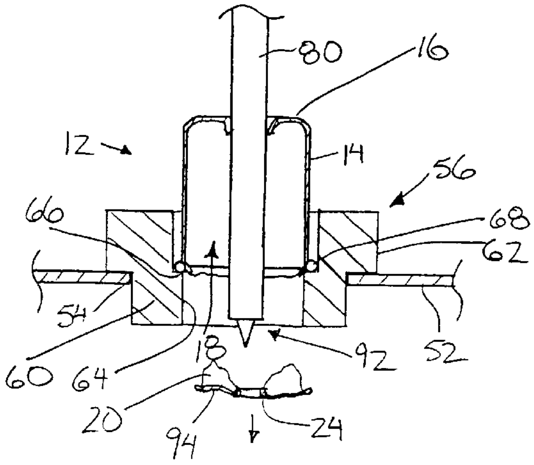

The actuator is arranged to displace the ram rods between respective loading positions as shown in FIG. 6 and respective punching positions as shown in FIG. 8. As the ram rods are displaced between the loading and punching positions, hydraulic pressure urges the ram rods to pierce filters which are supported within respective filter holders 56. Hydraulic fluid is supplied to the actuator 84 by a suitable pump 90 having a fluid supply reservoir and suitable controls as in conventional hydraulic mechanism operations.

Figure 7:
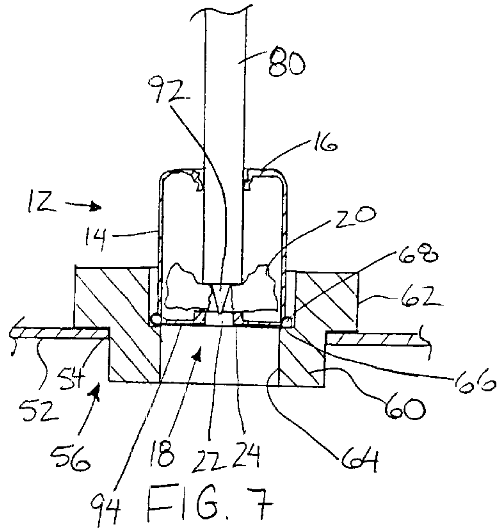

In the loading position of FIG. 6, each ram rod is supported with its penetrating end 92 spaced above the respective filter holder 56 so that the shoulder 66 and the penetrating end of the rod face one another with the filter being supported on the shoulder 66 there between. As the ram rod is displaced towards the punching position as shown in FIG. 7, the rod first pierces the capped end of the casing on the filter at which point the internal filtering components are crushed until the penetrating end of the rod engages the threaded nut 24 at the open end of the filter casing. Continued displacement of the rod into the punching position of FIG. 8 results in the end wall 94 of the internal filtering component of the filter being sheered from the rim 68 of the casing so that the crushed internal filtering component 20 falls through the opening in the filter holder to be deposited in the bin 42 there below. In the punching position of the ram rod, the rod extends concentrically through the opening of the filter holder with the end 92 of the rod being positioned beyond the shoulder 66 which supports the filter casing thereon.

The penetrating end 92 of the rod includes a pointed projection 96 which is generally conical in shape, tapering towards an apex in the axial direction of the rod. A base of the projection 96 is narrower than the diameter of the rod so that a laterally extending gripping surface 98 is defined which is generally planar and annular about the base of the pointed projection 96. The lateral gripping surface 98 provides a shelf which lies generally perpendicularly to the axial direction of the rod at an obtuse angle to the surface of the cone which is preferably at a 45 degree inclination to the axial direction.

The base of the pointed projection 96 at the penetrating end of each rod is arranged to be smaller than the internal diameter of the threaded nut 24 of the particular filter in question to be separated. The internal diameter of conventional threaded nuts 24 is generally in the range of ⅝ of an inch to one inch. The gripping surface 98 has a greater diameter than the internal diameter of the threaded nut 24 to ensure that the rod does not pass through the nut in a punching operation. In use the pointed projection is thus useful for penetrating through the capped end of the casing, however the surrounding laterally extending gripping surface 98 ensures that the rod does not pass through the threaded nut 24 at the open end of the filter casing while the pointed projection 96 is received within the threaded nut.

Figure 5:
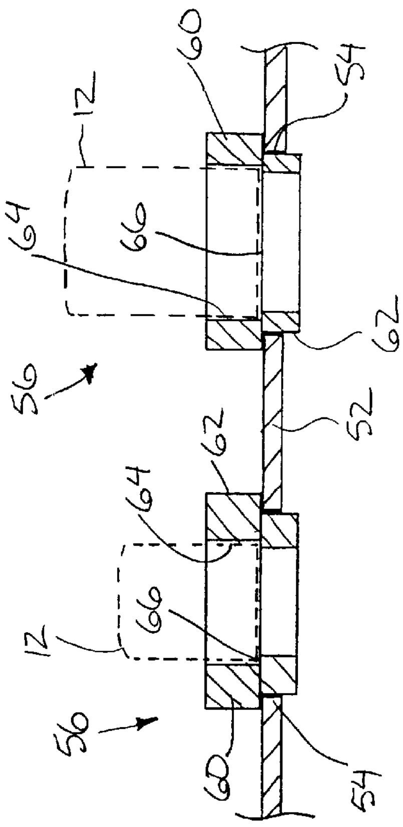
FIG. 5 is a sectional view of two filter holders of different size for supporting different size filters thereon which are shown in dotted line.
Figure 4:
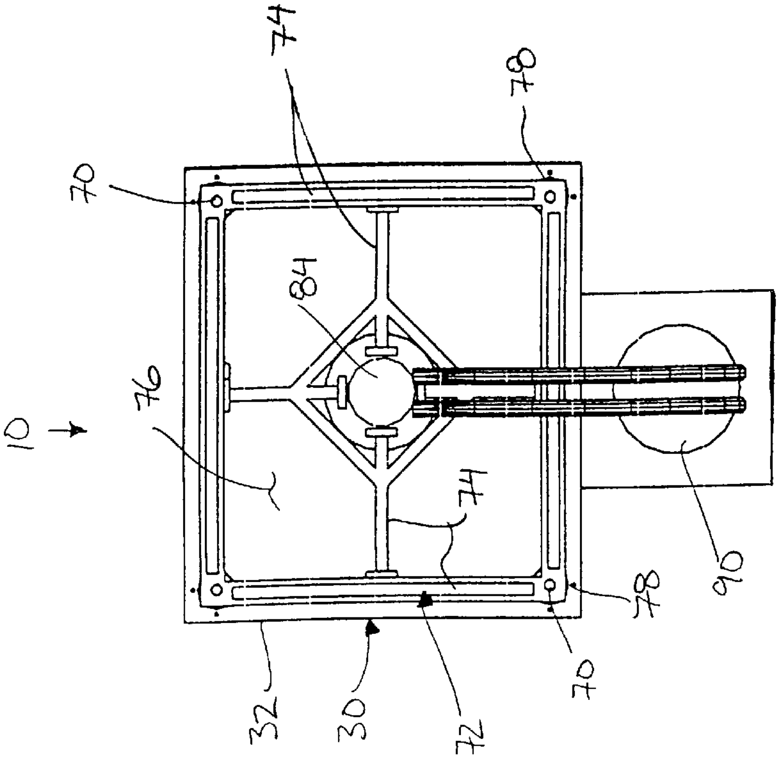

To use the apparatus 10 for separating the internal filtering component from the cylindrical casing of a filter, a filter holder 56 is first selected having a shoulder 66 which is suitably sized for supporting the open end of the cylindrical casing thereon without substantially restricting the open end of the casing to permit the internal filtering component to be removed therethrough. The selected filter holder 56 is then positioned within a respective circular opening 54 of the working area. The array of circular openings permits several filter holders with respective filters to be supported within the working area at the same time even when having differing internal dimensions for accommodating different size filters as illustrated in FIG. 5. Once the filter is supported within its respective holder so that only the peripheral rim about an outer edge of the casing is supported on the shoulder, the punching operation may then begin. Upon activation of the actuator 84, the sliding frame 76 is displaced downwardly towards the filter holders for punching the internal filtering components through the open end of the cylindrical casings of the filters in a single stepped operation. The rods are then raised commonly by retracting the actuator 84 to permit the casings of the filters remaining supported within the respective filter holders to be collected. The internal filtering components are automatically collected within the bin 42 positioned below the working area of the apparatus. Further filters may then be loaded within the respective filter holders.

Figure 10:
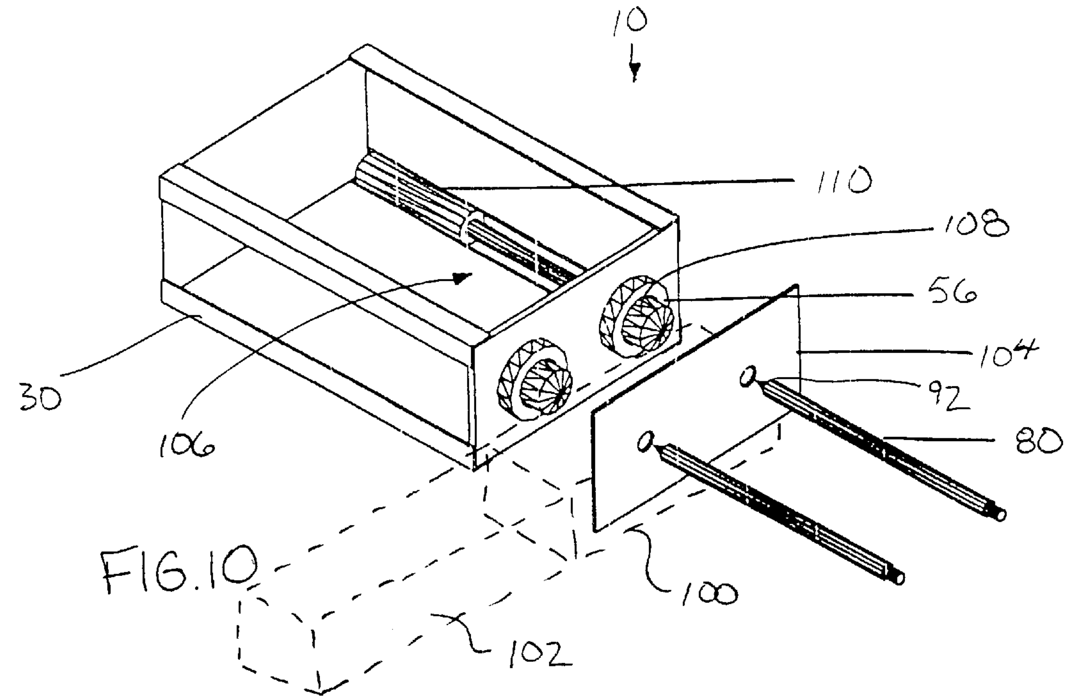
FIGS. 10 and 11 are isometric views of a further embodiment of the apparatus in a horizontally oriented configuration, shown in respective loading and punching positions of the ram rods.
Figure 11:
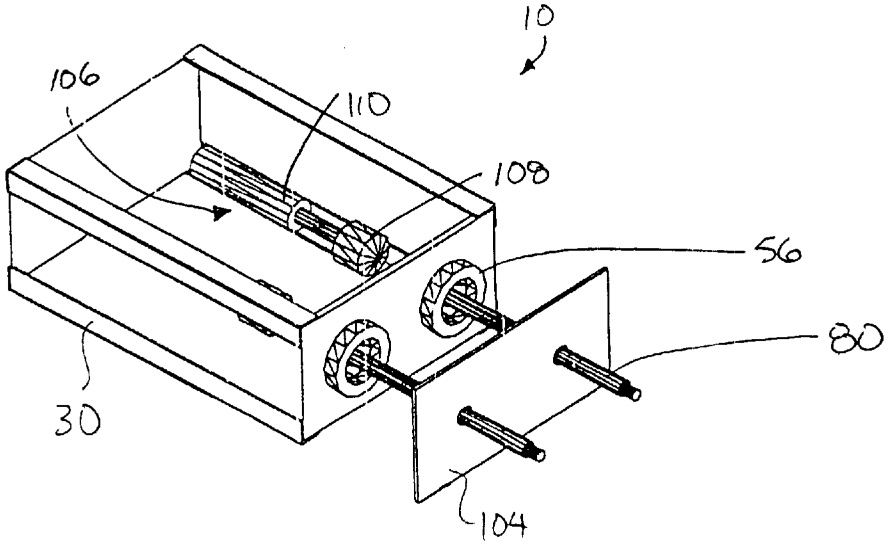
Figure 12:
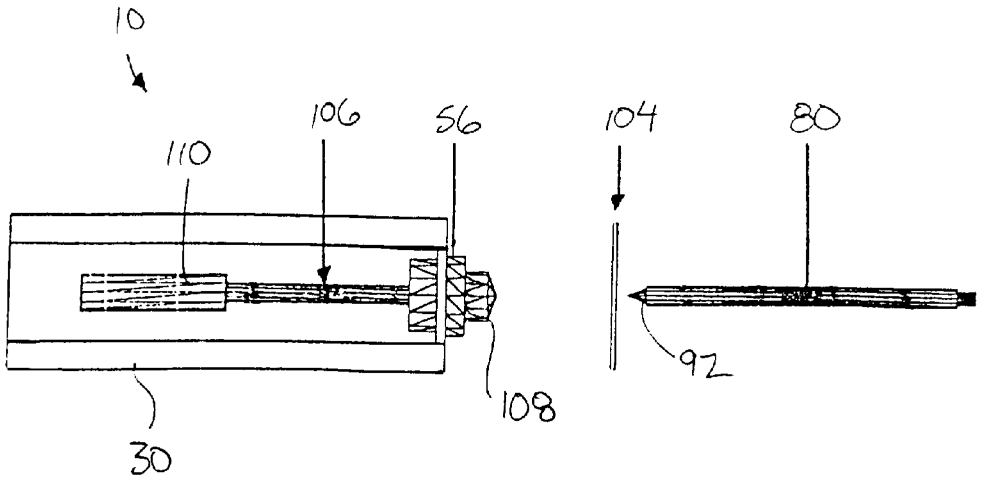
FIGS. 12 and 13 are top plan views of an alternate embodiment in which a single ram rod and filter holder are provided in a horizontal configuration, shown in respective loading and punching positions of the ram rod.
Figure 13:
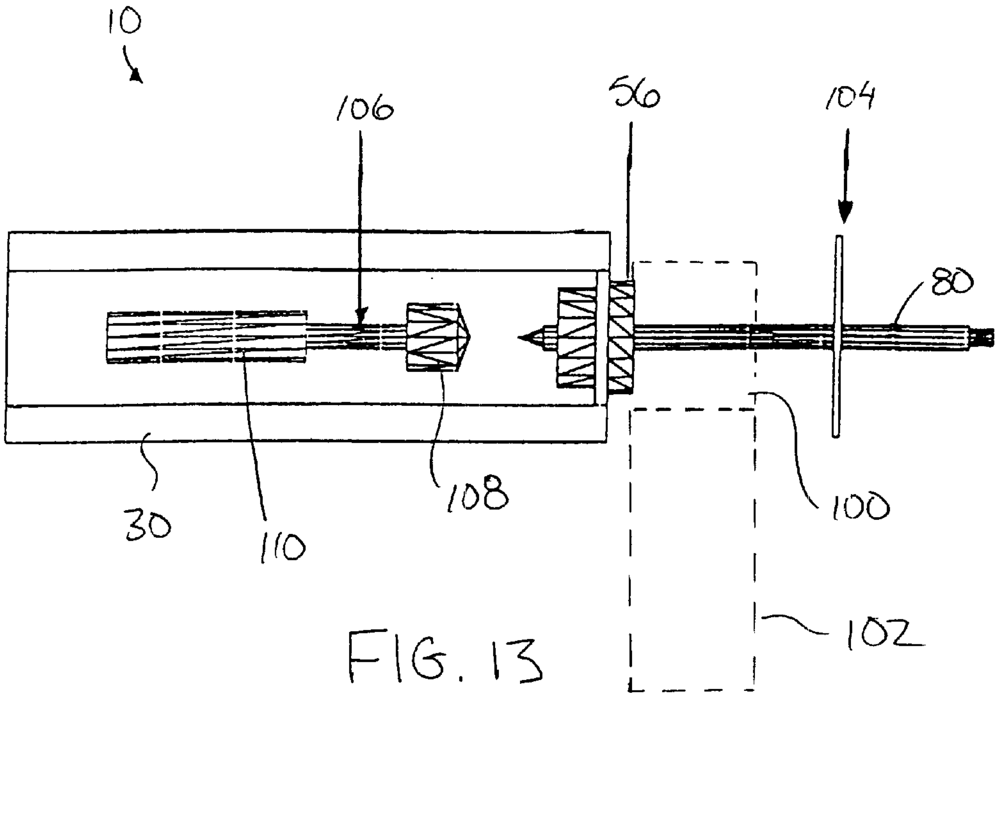

Further embodiments of the apparatus are illustrated in FIGS. 10 through 13 in which the ram rods and respective filter holders 56 are again positioned concentrically with one another, but in a horizontal configuration. Other than the horizontal configuration, the operation and components of the filter holder and ram rod 80 are similar to that of the previous embodiment. In FIGS. 10 and 11, a two rod apparatus 10 is illustrated while in FIGS. 12 and 13 a single rod model of the apparatus 10 is illustrated.

In the horizontal configuration, a cradle 100 is provided in alignment with the collar of the filter holder to permit a filter to be dropped therein, substantially concentrically aligned with the collar. A suitable loading mechanism 102 may also be provided to permit automatic loading of individual filters into the cradle 100. Once the filters are located in the cradle 100, the filters are automatically loaded into the respective filter holders by activation of the respective ram rods 80 which engage the capped end of the filter casings and subsequently punch through the casing as previously described.

Figure 9:
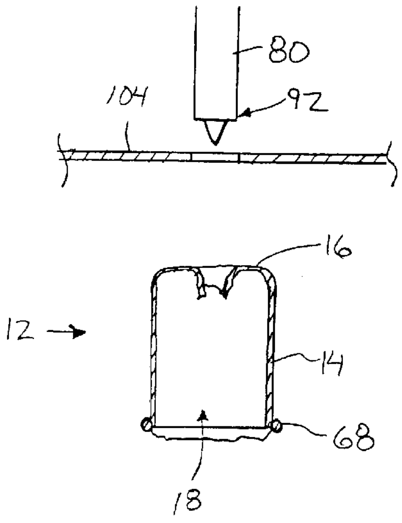

A stripper plate 104, also illustrated in FIG. 9 as an optional attachment in the vertical arrangement, may be provided to ensure that the casings do not remain engaged about the ram rods 80 as the ram rods are retracted into the loading position. The stripper plate 104 basically comprises a member having an aperture therein having dimensions which closely match the external dimensions of the rod permitting the rod to be slidably displaced there through. The stripper plate 104 may be fixed in relation to the filter holder or movable, however in either arrangement the rod is arranged to be movable relative to the stripper plate to be positioned on an opposite side of the stripper plate 104 than the filter holder in a loading position while extending through the stripper plate in the punching position.

A pusher mechanism 106 may also be provided in the horizontal configuration to assist in removal of the emptied filter casing from the filter holder upon completion of the punching operation. Each pusher mechanism includes a cylindrical plug 108 having outer dimensions which closely match the internal dimensions of the filter holder. The plug 108 is supported on a respective actuator 110 which displaces the pusher between a punching position spaced from the filter holder opposite the ram rod and a pushing position in which the plug is pushed through the filter holder from an opposite side of the holder than upon which the filter casing is supported to urge removal of the casing from the filter holder. The cradle 100 in this instance is preferably arranged to dispose of the emptied filter casing automatically. A bin would similarly be provided for collecting the crushed internal filtering components. The horizontal embodiment may further include retaining means for retaining the filter holders within the respective circular openings of the working area.

While various embodiments of the present invention have been described in the foregoing, it is to be understood that other embodiments are possible within the scope of the invention. The invention is to be considered limited solely by the scope of the appended claims.

What is claimed is:

1. An apparatus for separating components of a filter having an outer cylindrical casing component including an open end in communication with an internal filtering component and a capped end, the apparatus comprising:

a rigid ram rod having a penetrating end which is movable in an axial direction of the ram rod;

a filter holder having an opening extending therethrough in the axial direction of the ram rod in alignment with the ram rod and a peripheral support projecting about the opening for supporting the cylindrical casing component of the filter thereon with the open end in alignment with the opening; and an actuator for displacing the ram rod in the axial direction of the ram rod between a loading position in which the ram rod is spaced in the axial direction from the filter holder with the penetrating end facing the peripheral support and a punching position in which the ram rod extends through the opening in the filter holder beyond the peripheral support;

whereby the penetrating end of the ram rod penetrates the capped end of a filter supported on the filter holder to push the internal filtering component through the open end of the cylindrical casing component as the ram rod is displaced from the loading position to the punching position.

2. The apparatus according to claim 1 wherein the holder comprises a collar substantially concentrically aligned with the ram rod.

3. The apparatus according to claim 2 wherein the peripheral support comprises a shoulder formed in an inner surface of the collar which extends at least partway about a circumference of the collar.

4. The apparatus according to claim 3 wherein the shoulder spans radially less than 2 centimeters from the inner surface of the collar.

5. The apparatus according to claim 1 wherein the peripheral support extends about a full circumference of the opening.

6. The apparatus according to claim 1 wherein the ram rod and holder are supported on a frame, the holder being selectively separable from the frame for replacement with holders having differing dimensions.

7. The apparatus according to claim 1 wherein the penetrating end of the ram rod includes a pointed projection and a gripping surface which projects radially outwardly from a base of the pointed projection.

8. The apparatus according to claim 7 wherein the base of the pointed projection is smaller in diameter than an internal diameter of a threaded mount of the filter.

9. The apparatus according to claim 7 wherein the gripping surface at the penetrating end of the ram rod has a larger diameter than an internal diameter of a threaded mount of the filter.

10. The apparatus according to claim 1 wherein the ram rod is supported in an upright orientation above the holder and wherein there is provided a receptacle below the holder for receiving the internal filtering component of a filter therein.

11. The apparatus according to claim 1 wherein there is provided a plurality of ram rods in alignment with respective holders, the ram rods being movable together between respective loading and punching positions by the actuator.

12. The apparatus according to claim 1 wherein the ram rod extends generally horizontally and wherein there is provided a loading mechanism above the holder for loading filters into the holder.

13. The apparatus according to claim 1 including a pusher supported for movement in the axial direction in alignment with the opening in the holder opposite the ram rod.

14. The apparatus according to claim 1 wherein there is provided a rod stripper including an aperture therein for receiving the ram rod therethrough, the ram rod being movable relative to the rod stripper between the loading and punching positions.

15. A method of separating components of a filter, the method comprising:

providing a filter including an outer cylindrical casing component having an open end in communication with an internal filtering component and a capped end;

providing a holder having an opening extending therethrough and a peripheral support projecting about the opening;

supporting the cylindrical casing component of the filter on the peripheral support of the holder with the open end in alignment with the opening;

providing a rigid ram rod having a penetrating end which is movable in an axial direction of the ram rod in alignment with the opening extending through the holder;

penetrating the penetrating end of the ram rod through the capped end of the filter by displacing the ram rod in the axial direction between a loading position in which the ram rod is spaced in the axial direction from the holder and a punching position in which the ram rod extends through the opening in the holder beyond the peripheral support of the holder until the internal filtering component of the filter is pushed through the open end of the cylindrical casing component.

16. The method according to claim 15 wherein there is provided a plurality of holders having different size openings therein corresponding to different size filters, the method including selecting a holder having an opening which is closest to a size of the filter to be separated.

17. The method according to claim 15 wherein the penetrating end of the ram rod includes a pointed projection and a gripping surface which projects radially outwardly from a base of the pointed projection.

18. The method according to claim 17 wherein the base of the pointed projection is smaller in diameter than an internal diameter of a threaded mount of the filter.

19. The method according to claim 17 wherein the gripping surface at the penetrating end of the ram rod has a larger diameter than an internal diameter of a threaded mount of the filter.

20. The method according to claim 15 wherein the holder comprises a collar in which the peripheral support comprises a shoulder extending at least partway about an inner surface of the collar, the inner surface of the collar having a diameter within two centimeters of the outer diameter of the outer casing component.

* * * * *